United States Patent [19]

Amemiya et al.

[11] Patent Number: 4,924,461
[45] Date of Patent: May 8, 1990

[54] POLLING NETWORK COMMUNICATION SYSTEM HAVING TRANSMISSION REQUEST REGISTRATION MEANS

[75] Inventors: Shigeo Amemiya, Yokohama; Hiroaki Komine, Kawasaki; Tomohiro Shinomiya; Kazuo Iguchi, both of Yokohama; Tetsuo Soejima, Tokyo, all of Japan

[73] Assignee: Fujitsu Limited, Kawasaki, Japan

[21] Appl. No.: 286,872

[22] Filed: Dec. 20, 1988

[30] Foreign Application Priority Data

Dec. 22, 1987 [JP] Japan .................................. 62-326118

[51] Int. Cl.$^5$ ................................................ H04J 3/16
[52] U.S. Cl. .................. 370/95.2; 370/85.8; 370/95.1
[58] Field of Search .............. 370/90, 96, 85, 94, 370/85.7, 85.8, 95.1, 95.2, 95.3, 85.1, 94.1, 104.1; 340/825.08, 825.15

[56] References Cited

U.S. PATENT DOCUMENTS

| 4,726,017 | 2/1988 | Krum et al. | 370/85.8 |
| 4,742,512 | 5/1988 | Akashi et al. | 370/96 |
| 4,809,268 | 2/1989 | Tejima et al. | 370/95.2 |

FOREIGN PATENT DOCUMENTS

| 0286134 | 10/1988 | European Pat. Off. | 370/96 |
| 0023641 | 2/1984 | Japan | 370/96 |
| 0281635 | 12/1987 | Japan | 340/825.08 |
| 0105599 | 5/1988 | Japan | 340/825.08 |

Primary Examiner—Douglas W. Olms
Assistant Examiner—Alpus H. Hsu
Attorney, Agent, or Firm—Staas & Halsey

[57] ABSTRACT

In a sequential polling type communication network system including a master station, a first channel, a second channel, and at least two slave stations, the master station includes request registration units for registering data transmission requests from slave stations during a data transmission by another slave station, and an interrupt polling unit for polling the slave station which has issued the data transmission request after completion of the data transmission or completion of a polling of a slave station, and the slave station includes a unit for responding to a polling during the data transmission, and transitting a data transmission request when data to be transmitted exists, and for responding to the interrupt polling from the master station, and transmitting the data to the master station until the data transmission is completed.

9 Claims, 12 Drawing Sheets

P: POLLING

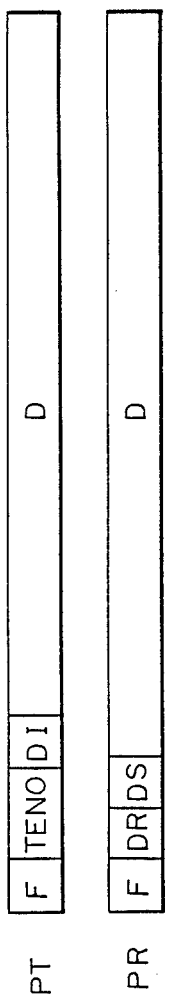
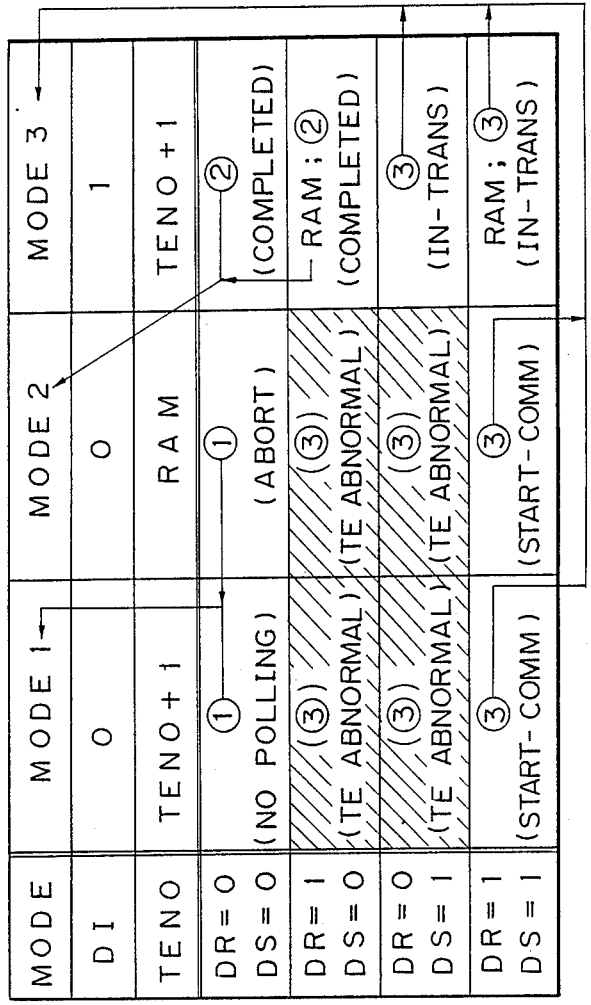
Fig. 6a
Fig. 6b
Fig. 9

P: POLLING

POLLING NETWORK COMMUNICATION SYSTEM HAVING TRANSMISSION REQUEST REGISTRATION MEANS

BACKGROUND OF THE INVENTION

1. Field of the Invention

The present invention relates to a data communication network system, more particularly, to a polling type network communication system in which a master station has a unit for registering transmission requests from slave stations and carrying out a polling in accordance with registered transmission requests, to improve an effective polling speed.

2. Description of the Related Art

In a data communication network system, a plurality of slave stations are sequentially communicated with a master station by a polling method, but sequential-polling method has the disadvantages of a slow response time and a low polling speed. Specific prior art will be described later with reference to the drawings.

SUMMARY OF THE INVENTION

An object of the present invention is to provide an improved polling network communication system in which the polling response time is improved.

According to the present invention, there is provided a polling type communication network system including a master station, a first channel, a second channel, and at least two slave stations operatively connected to the master station through the first and second channels. The master station includes a sequential polling unit for sequentially polling the slave stations in a predetermined sequence through the first channel, a request registration unit for registering a request for data transmission from the slave station through the second channel while a data is being transmitted by another slave station, and an interrupt polling unit for polling the slave station which has registered a data transmission request after a completion of a data transmission or a completion of a polling of a slave station. The slave station includes a first response unit for responding to the normal polling from the master station and transmitting a disconnection signal to the master station through the second channel when data to be transmitted does not exist, and a second response unit for responding to the normal polling from the master station, transmitting a connection signal to the master station through the second channel when data to be transmitted exists, and transmitting the data to the master station until the data transmission is completed.

The sequential polling by the master station is carried out during this data transmission. The slave station further includes a third response unit for responding to the polling of the slave station during a data transmission and transmitting a data transmission request when data to be transmitted exists, and a fourth response unit for responding to the interrupt polling from the master station/ and transmitting the data to the master station until the data transmission is completed.

The operations of the master station and slave stations are carried out synchronously to a frame period. The first and second channels can be wireless bus lines.

According to the present invention, there is also provided a method of communication in a network system including a master station, a first channel, a second channel, and at least two slave stations operatively connected to the master station through the first and second channels, including the steps in master station and the steps in each slave station. The steps in the master station include, (a) a sequential polling step for sequentially polling the slave stations in a predetermined sequence through the first channel, (b) a request registration step for registering a data transmission request from the slave station through the second channel during data transmission by another slave station, and (c) an interrupt polling step for polling the slave station which has registered a data transmission request after a completion of the data transmission or completion of a polling of a slave station. The steps in the slave station include (aa) a first response step for responding to the normal polling from the master station and transmitting a disconnection signal to the master station through the second channel when data to be transmitted does not exist, and (ab) a second response step for responding to the normal polling from the master station, transmitting a connection signal to the master station through the second channel when data to be transmitted exists, and transmitting the data to said master station until the data transmission is completed.

The sequential polling by the master station is carried out during the data transmission. The steps of the slave station further include: (ac) a third response step for responding to the polling of the slave station during the data transmission, and transmitting the data transmission request when data to be transmitted exists, and (ad) a fourth response step for responding to the interrupt polling from the master station, and transmitting the data to the master station until the data transmission is completed.

BRIEF DESCRIPTION OF THE DRAWINGS

Other objects and features of the present invention will be described with reference to the accompanying drawings, in which;

FIGS. 6a and 6b are views representing polling request data formats of the present invention;

FIG. 9 is a chart illustrating a status transition of the present invention;

DESCRIPTION OF THE PREFERRED EMBODIMENTS

Before describing the preferred embodiments of the present invention, a prior art sequential-polling network communication system will be described.

Figure 1:
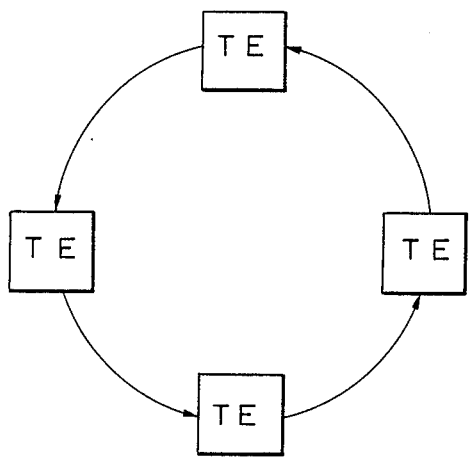
FIG. 1 is a block diagram of a conventional ring connection network system.

In a ring connection network system shown in FIG. 1, a plurality of terminals TE are connected to one another in a ring-like network, and a polling is passed among these terminals TE. In this case, if one of the terminals TE polled from another terminal TE having a request for communication has not issued a request for communication, the terminal number in the frame is updated to a number of a next terminal TE to which the polling is passed. If a request for communication is issued, the polling bit in the frame is changed from, for example, "1" to "0", and communication between the terminals TE is started: After the communication is completed, the polling bit in the frame is restored from "0" to "1" and the polling is passed among the terminals TE again.

Figure 2:
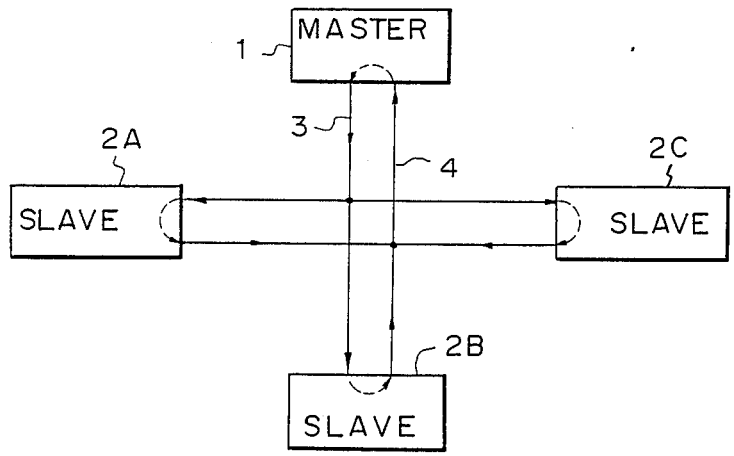
FIGS. 2 and 3 are block diagrams of conventional bus connection network systems.

Further, in a logical bus type network system shown in FIG. 2 a master station 1 is communicated to a plurality of slave stations 2A to 2C through a downstream bus line 3 and an upstream bus line 4, by a polling. In this case, communication between the master station 1 and the slave stations 2A to 2C is always established by applying a master-slave relationship to the terminals. In another type of bus type network system shown in FIG. 3, the master station shown in FIG. 2 corresponds to a network terminal NT and the slave stations 2A to 2C correspond to terminals TEl to TEn.

The operation of polling in the bus type network system shown in FIG. 2 or 3 will be described with reference to FIG. 4. The master station 1(NT) sequentially polls the slave stations 2A(TEl) to 2E(TEn) through the downstream bus line 3. In this case, the slave station 2C(TE3) has data to be transmitted and sends a request for communication through the upstream bus line 4 to obtain a transmission right from the master station 1, and then the data transmission to the master station 1 can be carried out through the upstream bus line 4. When the data transmission is completed, the slave station 2C sends a request for termination of the communication, and the transmission right is returned to the master station 1 through the upstream bus line 4. Note, if a slave station, for example, 2A, has no data to be transmitted, the transmission right is also returned to the master station 1 through the upstream bus line 4. Upon receiving the returned transmission right, the master station 1 passes the transmission right to the next slave station through the downstream bus line 3, and then a similar polling operation is carried out. In this way, the transmission right is sequentially passed to the slave stations.

Figure 4:
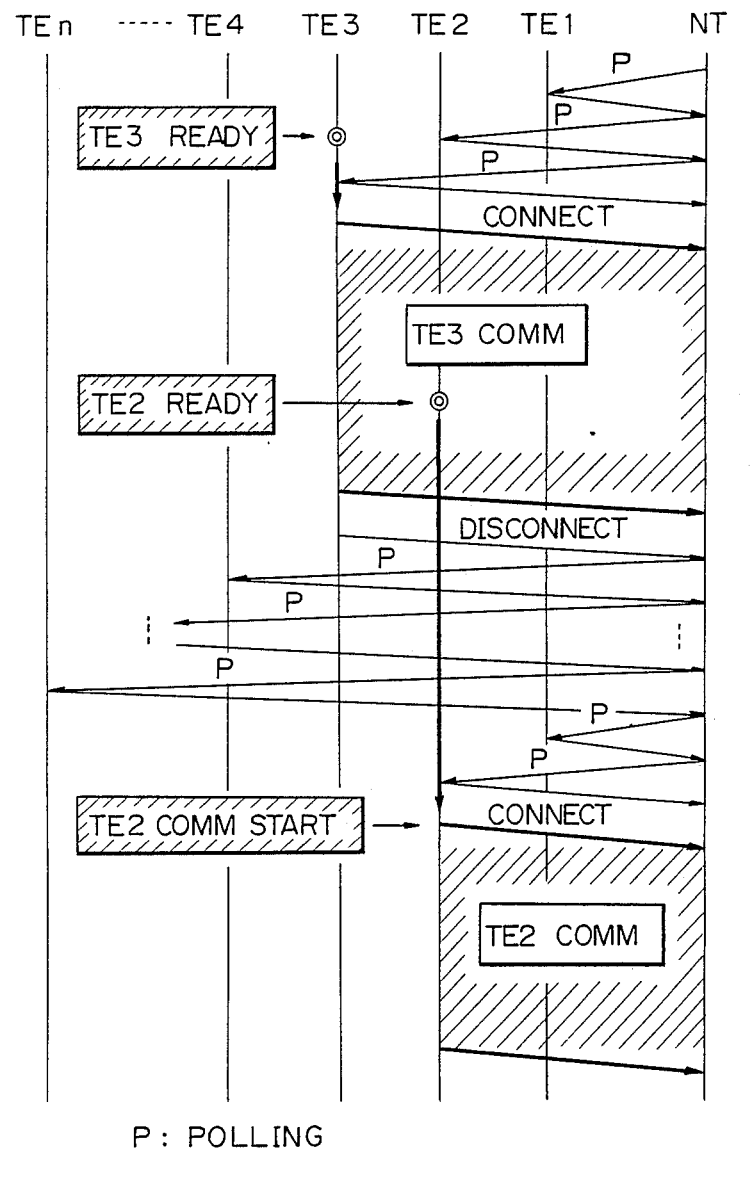
FIG. 4 is a diagram representing a prior art polling sequence.

In the meantime, as shown in FIG. 4, when the slave station 2C is transmitting data under the acquired transmission right, the master station 1 does not poll the other slave stations, and after the slave station 2C has completed the transmission, the master station 1 restarts the polling to a next slave station 2D. In FIG. 4, when the slave station 2B requests the transmission right during the transmission by the slave station 2C, the acquisition of the transmission right for the slave station 2B is deferred until the completion of the polling for the slave station 2A in the next polling period, regardless of data transmission requests from the slave stations 2D to 2A.

Now the present invention will be described.

Figure 5A:
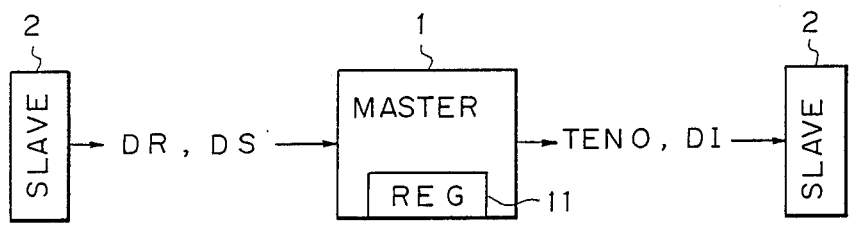
FIGS. 5a and 5b are block diagrams illustrating the concept of the present invention.
Figure 5B:
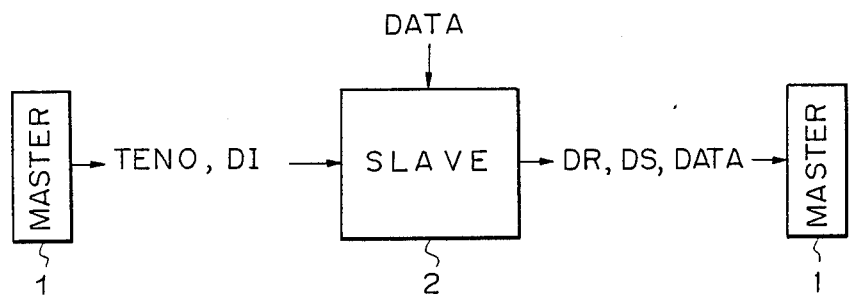

FIGS. 5a and 5b illustrate the concept of the present invention.

Figure 3:
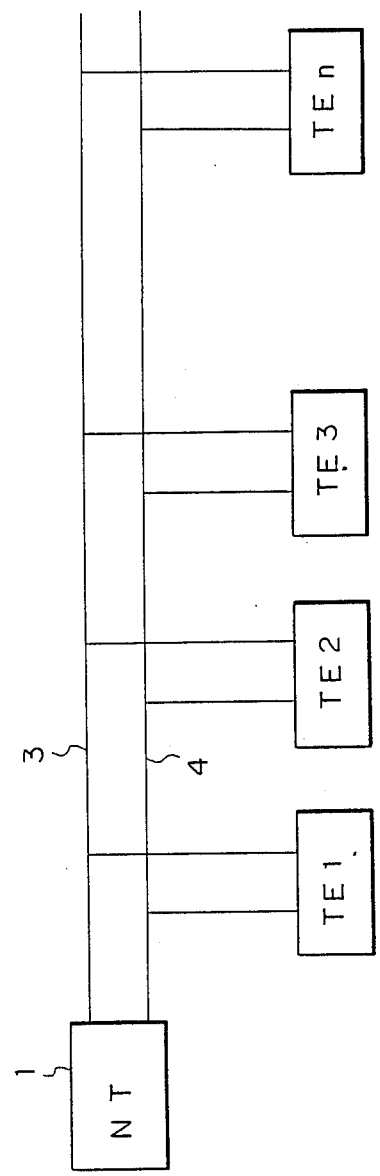

In FIG. 5a, a master station 1 corresponding to the master station 1 shown in FIG. 2 or 3 receives a data-transmission-request signal DR, shown in FIG. 6b, indicating that a slave station corresponding to the slave station shown in FIG. 2 or 3 has issued a transmission request, and a transmission-in-progress signal DS, shown in FIG. 6b, indicating that another slave station is transmitting data to the master station. The master station 1 outputs a terminal number signal TENO, shown in FIG. 6a, indicating a terminal number of a slave station to be polled, and a reception-in-progress signal DI, shown in FIG. 6a, indicating that the master station 1 is now receiving data, to the slave stations. FIGS. 6a and 6b show the polling control data formats. Namely, FIG. 6a shows a polling control data PT transmitted from the master station, and FIG. 6b shows a polling control data PR received at the master station. In FIGS. 6a and 6b, reference F denotes a starter of a frame signal, and reference D denotes data.

In FIG. 5b, the slave station 2 receives the terminal number signal TENO and the reception-in-progress signal DI from the master station 1, and then outputs the data-transmission-request signal DR, the transmission-in-progress signal DS, and the data D to be transmitted to the master station 1.

In FIGS. 5a and 5b, when one slave station 2 is transmitting data to the master station 1, the master station 1 receives the transmission-in-progress signal DS, outputs the reception-in-progress signal DI to the slave station 2, and transmits the terminal number signal TENO to continue the polling to the slave station 2.

The master station 1 comprises a unit 11 for registering terminal numbers of the slave stations. During the data transmission of the above slave station, the master station 1 continuously polls other slave stations by using the upstream bus line 4, so that another slave station corresponding to the output terminal number signal TENO, outputs a data-transmission-request signal DR to the master station 1 through the upstream bus line 4 when having data to be transmitted. The master station 1 then stores a terminal number of the slave station which has issued the data-transmission-request signal DR to the registration unit 11, and when the data transmission by the slave station 2 is completed, the transmission-in-progress signal DS is reset and the master station 1 polls the slave station for which the corresponding terminal number signal TENO is stored in the registration unit 11 and which has issued the data-transmission-request signal DR. In this way, the master station 1 can poll a slave station which has issued a transmission request, immediately after completion of the data transmission of the slave station.

The embodiments of the polling network communication system in accordance with the present invention will now be described.

Figure 7:
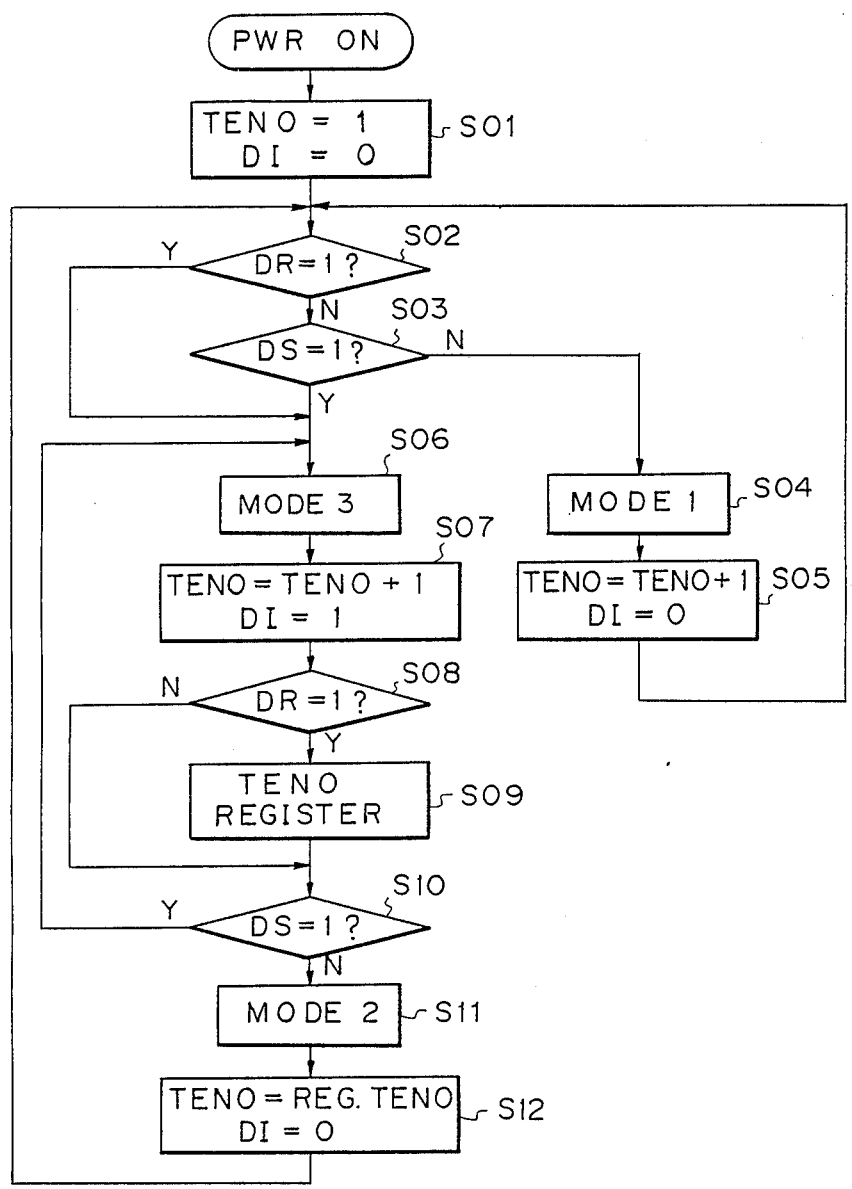
FIG. 7 is a flow chart showing the operation of a master station of the present invention.
Figure 8:
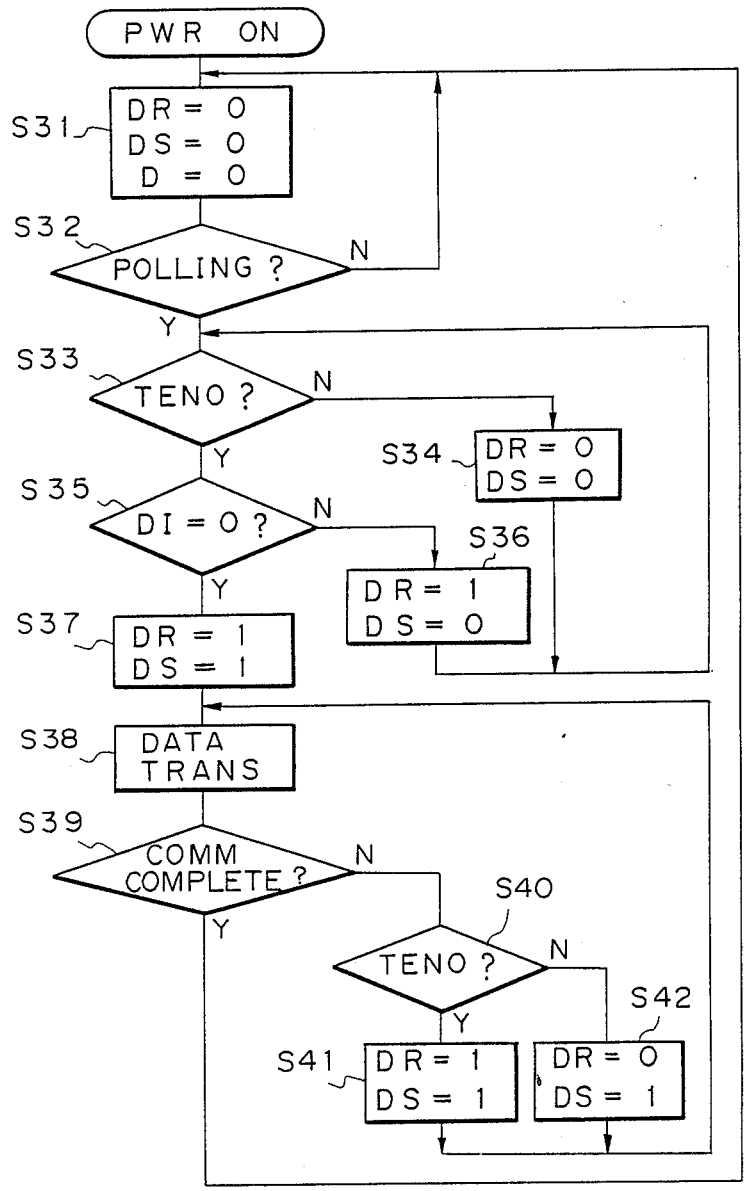
FIG. 8 is a flow chart showing the operation of a slave station of the present invention.

First, an embodiment of the master and slave stations, the operations of which are shown in FIGS. 7 and 8, which are formed by microcomputers, will be described.

The operation of the microcomputer master station 1 will be described with reference to FIG. 7.

STEP 01 (S01)

When the power supply is turned ON, an initialization is carried out. Namely, a terminal number for polling TENO is set at one, a transmission-in-progress signal DI is cleared, and the registration means, for example, a random access memory (RAM), is cleared.

STEP 02 (S02)

A polling is carried out of a slave station corresponding to the terminal number signal TENO, and the master station 1 receives a data-transmission-request signal DR from the polled slave station. When the signal DR is "0", indicating a non-data transmission from the polled slave station, the polling control is transferred to step 03 (S03), or in the other case, to step 06 (S06).

STEPS 03–05 (S03–S05)

Figure 10:
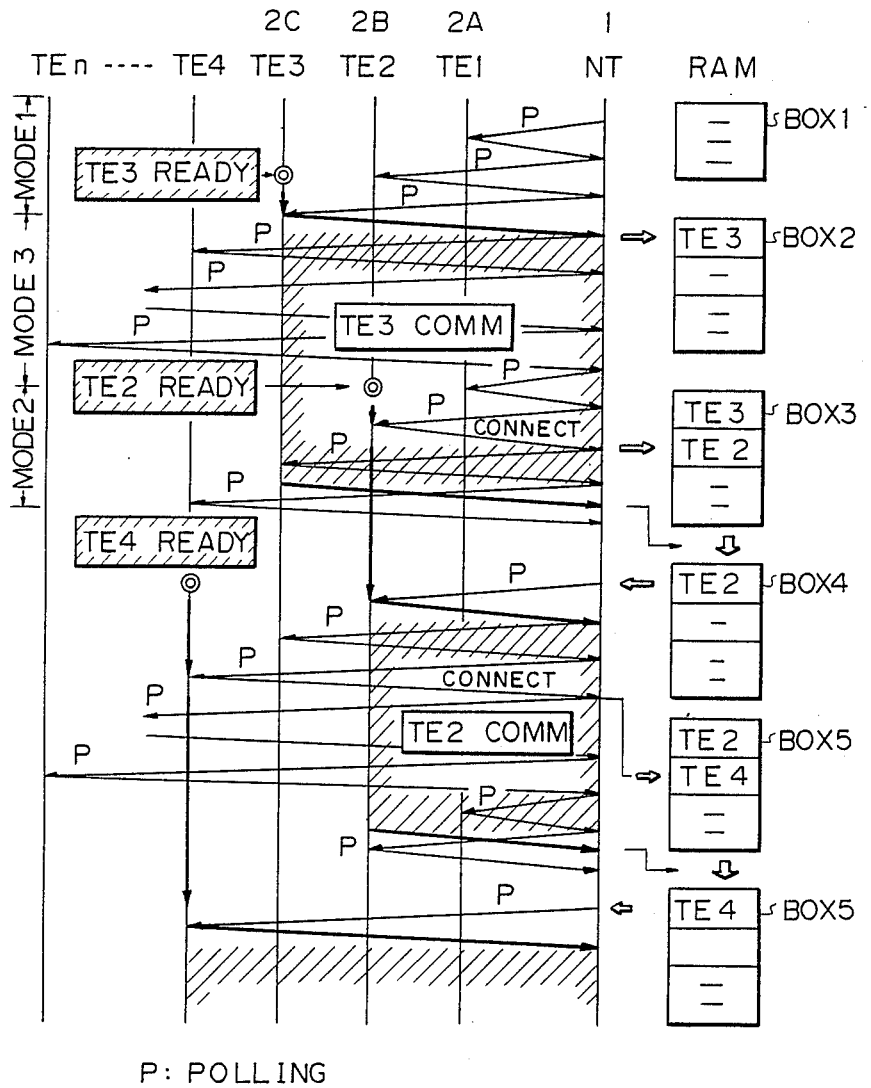
FIG. 10 is a diagram illustrating a polling sequence the present invention.
Figure 11:
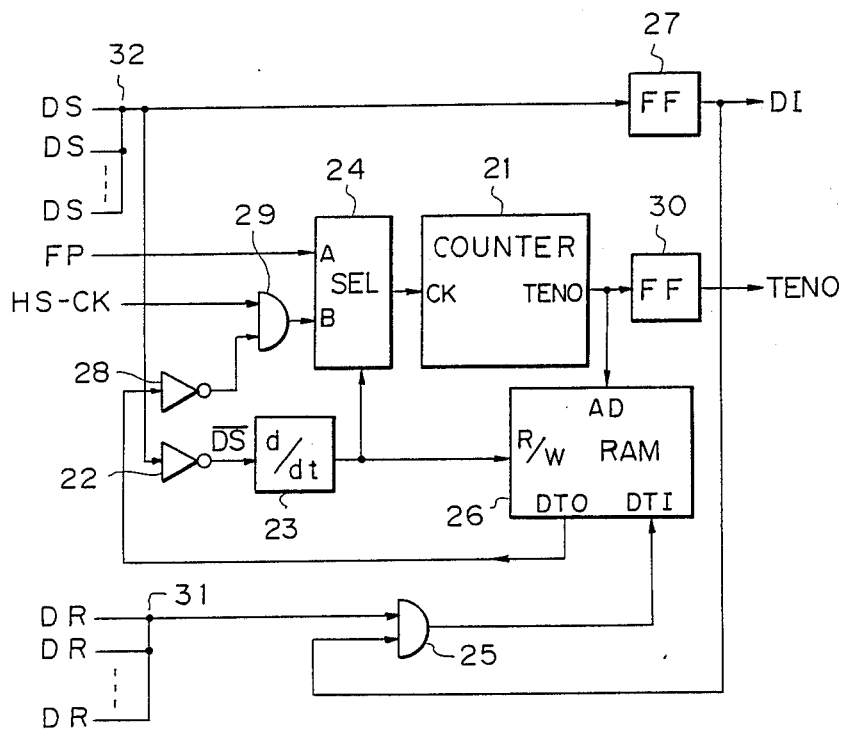
FIG. 11 is a circuit diagram of an embodiment of a master station in accordance with the present invention.

When the transmission-in-progress signal DS is "0", i.e., a data transmission by the slave station is not currently underway (S03), a MODE 1, which indicates a transmission-not-in-progress and a non-data-transmission-request, as shown in FIGS. 9 and 10, is set (S04). [In the MODE 1, only a pure polling is carried out, which means a no-data-transmission-request to the polling, and during the data transmission.]Then the terminal number signal TENO is incremented by one (TENO =TENO+1), and the reception-in-progress signal DI is cleared (DI=0)(S05).

The control of the polling is transferred to step 02 (S02), and a polling of a next slave station is carried out.

STEPS 06–07 (S06–S07)

When the signal DR=1 indicating the data-transmission-request or the signal DS=1 indicating the transmission-in-progress, a MODE 3, which indicates that there is a response of a data-transmission-request to the polling or the data transmission is currently in process, is set (S06), then, at step 07, the terminal number is incremented and the transmission-in-progress signal DI is set.

STEPS 08–09 (S08–S09)

A polling of a next slave station is carried out to search for a data-transmission-request from other slave stations during the data transmission of the current slave station. If the data-transmission-request is detected (DR=1), the terminal number of that slave station, for example, TE2 of BOX 3 in FIG. 10, is stored to the registration unit, specifically, the RAM.

STEPS 10–12 (S010–S12)

If the data transmission is not completed (DS=1), the control of the polling is transferred to step 06, and the above steps 06 to 10 are repeated.

If the data transmission is completed (DS=0), a MODE 2, which indicates an interrupt polling, is set (S11). The terminal number TE2 stored in the RAM is set as the terminal number signal TENO (STEP 12, BOX 4 in FIG. 10) and the reception-in progress signal is reset (DI =0), so that a polling of the slave station of the terminal number TE2 is carried out, and a data transmission by that slave station can be carried out.

The operation of the microcomputer slave station will also be described with reference to FIG. 8.

STEP 31 (S31)

When the power supply is turned ON, an initialization is carried out. Namely, a data-transmission-request signal DR and a transmission-in-progress signal DS in this slave station are cleared, and data to be transmitted therefrom is also cleared.

STEP 32 (S32)

The master station 1 periodically polls all of the slave stations through the downstream bus line 3 while a data transmission by one slave station is in progress. Then each slave station checks the polling from the master station 1.

STEPS 33–34 (S33–S34)

The slave station checks whether or not the terminal number sent from the master station corresponds to its own terminal number. When the terminal number from the master station does not coincide with the terminal number of the slave station namely, the polling is not for that slave station, the slave station sets the DR=0 and DS=0 to indicate no response.

STEPS 35–36 (S35–S36)

When the terminal number from the master station coincides with the terminal number of the slave station, and the reception-in-progress signal from the master station 1 is set (DI=1), The slave station sets the data-transmission-request signal DS at 1 and resets the transmission-in-progress signal DS in the slave station, and waits for the completion of the data transmission by another slave station.

STEPS 35–38, (S35–S38)

When the terminal number from the master station coincides with the terminal number of the slave station, and the reception-in-progress signal from the master station 1 is reset (DI=0), the slave station sets the data-transmission-request signal DR and the transmission-in-progress signal DS in the slave station (DR=1, DS=1).

When a data transmission is required, the data transmission is started and continued until completed.

In the master station 1, since the DR=1 and DS =1, the MODE 3 is set and the reception-in-progress signal DI is set (DI=1).

STEP 39 (S39)

When the data transmission is completed, the control is returned to step 31 and the above operation restarted.

STEPS 39, 40–42 (S39, S40–S42)

Before completion of the data transmission, when a new polling is received, if the terminal number from the master station 1 coincides the terminal number the slave station, the data-transmission-request signal DR=1 and the transmission-in-progress signal in the slave station DS=1 are maintained to continue the above data transmission (S39, S40, S41). If the terminal number from the master station 1 does not coincide the terminal number of the slave station, the data-transmission-request signal DR=0 and the transmission-in-progress signal in the slave station DS =1 are set (S39, S40, S42). The signal DR =1 means that an illegal (redundant) registration of the terminal number during a data transmission is prevented, and the signal DS=1 means that the above data transmission is continued.

The status transition shown in FIG. 9 shows the status changes among the MODE 1 to the MODE 3, described above.

Second, another embodiment of the master and slave stations, which are formed by hardware circuits, will be described. The operations thereof are substantially the same as those described above with reference to FIGS. 7 to 11.

A master station includes a first flip-flop circuit (FF) 27, and a wired OR circuit 32 receiving a plurality of transmission-in-progress signals DS from a plurality of slave stations. The FF 27 stores a reception signal resulting from the transmission-in-progress signal(s) DS, and outputs a reception-in-progress signal DI. The master station also includes an AND gate 29, a selector 24, a counter 21, a second FF 30 for storing a terminal number to be polled, a first inverter 28, a second inverter 22, a differential circuit 23, a RAM 26 for registering a terminal number of a slave station which has issued a data transmission request during the data transmission by another slave station, a wired OR circuit 31 receiving a plurality of data-transmission-request signals DR from the plurality of the slave stations, and an AND gate 25.

In a normal polling, i.e., the MODE 1, the selector 24 receives a frame pulse FP at an input terminal A and outputs the same to a clock terminal CK of the counter 21. The counter 21 increments a count value therein, which indicates the terminal number of a polling, and outputs the terminal number from an output terminal TENO. The output terminal number TENO is held at the FF 30 and is used to designate a slave station to be polled.

When the data-transmission-request signal DR is received during the data transmission by an other slave station, the wired OR circuit 31 and the AND gate 25 cooperate to issue a terminal store signal TSTORE to a terminal DT1 of the RAM, and to store the terminal number of the slave station which has issued the data-transmission-request signal DR.

The inverter 22 and the differential circuit 23 cooperate to detect a completion of the data transmission, and when the completion is detected, a read signal R is output to a control terminal of the selector 24 and a read/write control input terminal R/W of the RAM 26. Upon receipt of the read signal, the selector 24 inputs a signal from another input terminal B. [A high speed clock HS-CK having a frequency $F_H = NXF_F$, where N denotes the number of the slave stations, and $F_F$ denotes a frequency of the frame pulse FP is supplied to AND gate 29.] Accordingly, when the terminal B is selected, the high speed clock HS-CK is output to the counter 21 to count all terminal numbers in a frame and pick up the terminal number stored during the data transmission. The terminal number is supplied to an address input terminal AD of the RAM 26, to read the stored terminal number from an output terminal DTO of the RAM 26. When the stored terminal number is read, an output of the inverter 28 is made low level to stop the application of the high speed clock HS-CK, then the terminal number corresponding to the stored terminal number is stored to the FF 30, and the interrupt polling is started. Thereafter, the output signal from the differential circuit 23 is made a level indicating a write signal to select the frame pulse FP at the selector 24 and to store the terminal number of the slave station which has issued the data-transmission-request during the data transmission.

Figure 13:
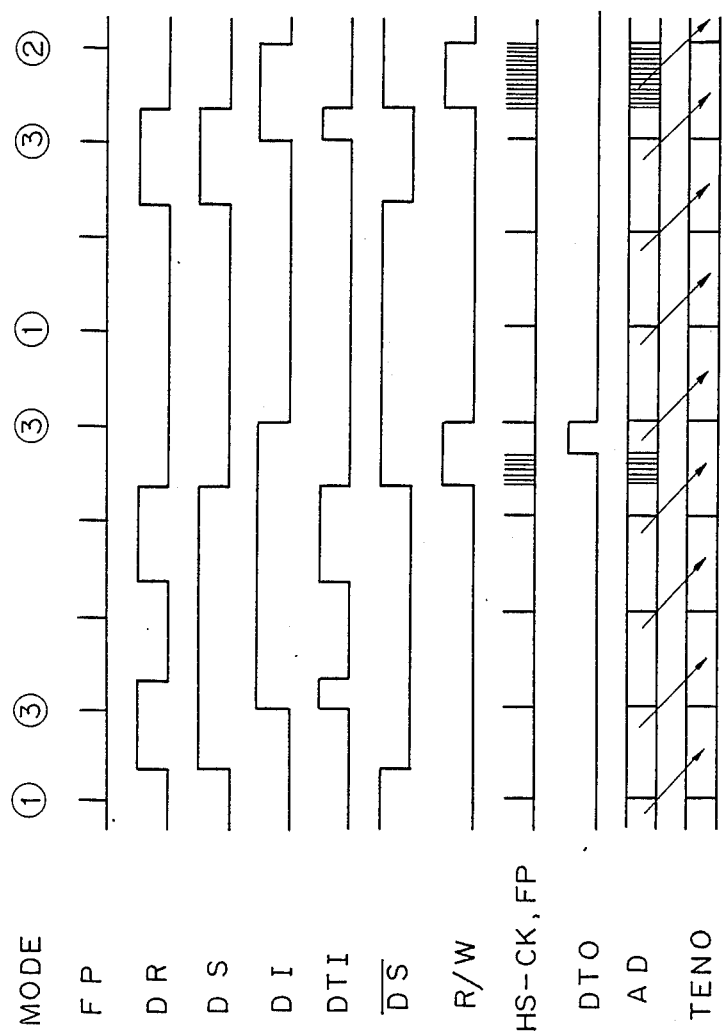
FIGS. 13 and 14 are timing charts representing the operations of the master and slave stations shown in FIGS. 11 and 12.

FIG. 13 shows the above operation of the master station.

Figure 12:
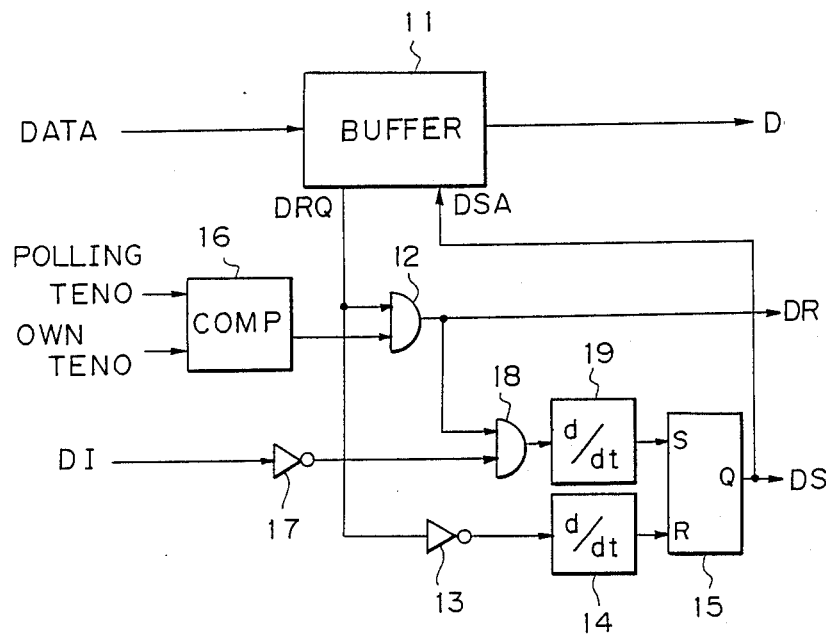
FIG. 12 is a circuit diagram of an embodiment of a slave station in accordance with the present invention.

In FIG. 12, the slave station includes a data buffer 11 storing data to be transmitted to the master station, a comparator 16, AND gates 12 and 18, inverters 13 and 17, differential circuits 14 and 19, and a set-reset type FF 15.

When the power supply is turned ON, an output terminal DRQ becomes low ("0"), an output from the AND gate 12, indicating a data-transmission-request signal DR, becomes "0", and the FF 15 is reset through the inverter 13 and the differential circuit 14, resulting in a transmission-in-progress signal DS equal to "0". The signal DS having a low level is supplied to the buffer 11 as a data send available signal DSA to clear all data in the buffer 11. When data is stored to the buffer 11, the output terminal DRQ is made high level.

When polling is carried out, and a terminal number from the master station coincides the terminal number of a slave station, the comparator 16 outputs a high level signal, and as a result, the data-transmission-request signal DR becomes "1". When there is no data transmission to the master station, a reception-in-progress signal DI from the master station is "0", the FF 15 is set to output the data-transmission-in-progress signal DS at a high level ("1"), and consequently, a data transmission is started.

When the slave station receives a polling thereof during the data transmission, the data-transmission-request signal DR is maintained at "1", but the transmission-in-progress signal DS becomes "0", since the reception-in-progress signal DI is high level. When the polling is not for the slave station, the data transmission-request DR is "0" and the transmission-in-progress signal DS is "1".

Figure 14:
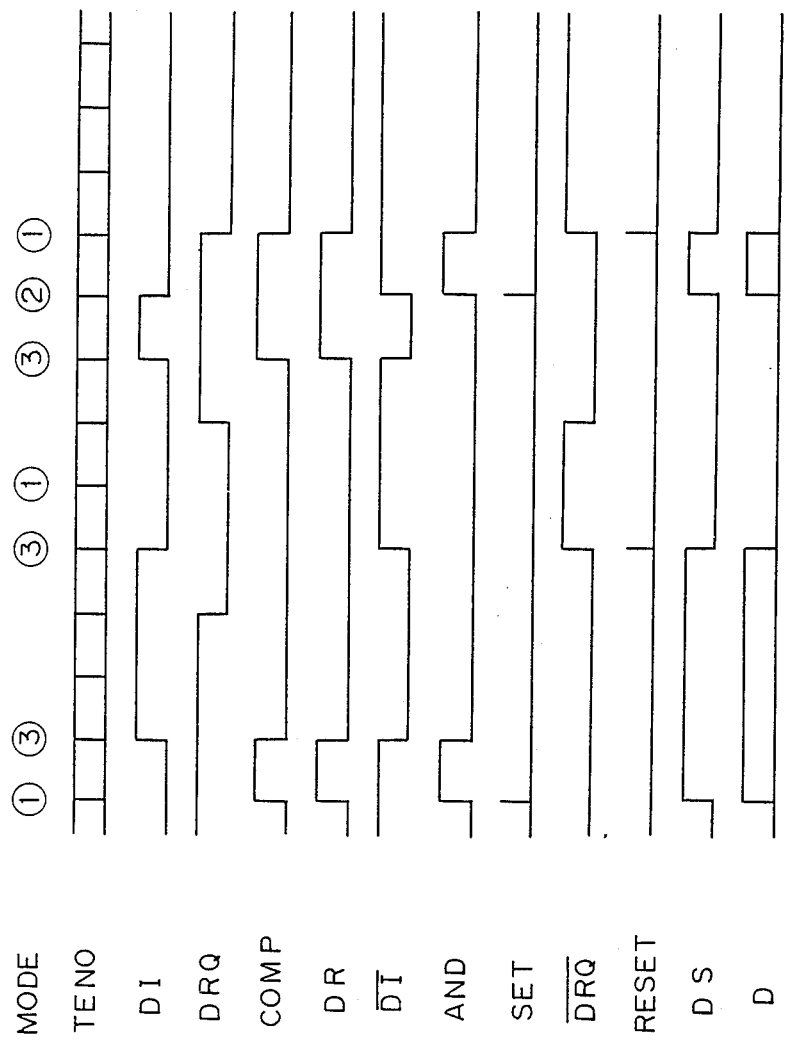

FIG. 14 shows the above operation of the slave station.

In the above embodiments, the bus type network system in which the master station and the slave stations are connected by the upstream and downstream bus lines 3 and 4 which is electrical conductive wire cables or optical fiber cables is described, but the present invention is not limited to the bus line connection network system and can be applied, for example, to a polling type wireless network system.

Many widely different embodiments of the present invention may be constructed without departing from the spirit and scope of the present invention. It should be understood that the present invention is not limited to the specific embodiments described in this specification, except as defined in the appended claims.

We claim:

1. A polling type communication network system for transmitting data between a master station and slave stations via a first channel and a second channel, said system comprising:

a master station comprising:

sequential polling means for sequentially carrying out a normal polling of said slave stations in a predetermined sequence through the first channel even during transmission of data between said master station and any of said slave stations, request registration means for registering a data transmission request from a first slave station through the second channel while a data transmission between said master station and a second slave station is carried out, and interrupt polling means for carrying out interrupt polling prior to the normal polling of the first slave station having the data transmission request registered in said request registration means, after completion of the data transmission by the second slave station; and slave stations, operatively connected to said master station via the first and second channels, each of said slave station comprising:

first response means for responding to the normal polling of said sequential polling means and transmitting a disconnection signal to said master station through the second channel when data to be transmitted does not exist, second response means for responding to the normal polling of said sequential polling means, transmitting a connection signal to said master station through the second channel when data to be transmitted exists, and transmitting, in response to the normal polling, the data to said master station until the data transmission is completed, third response means for responding to the normal polling of said sequential polling means during the data transmission between said master station and the second slave station and for transmitting the data transmission request to said request registration means when data to be transmitted exists, and fourth response means for responding to the interrupt polling of said interrupt polling means and transmitting, in response to the interrupt polling, the data to said master station until the data transmission is completed.

2. A polling type communication network system according to claim 1, wherein said master station and said slave stations operate synchronized to a frame period.

3. A polling type communication network system according to claim 1, wherein the first and second channels are cables.

4. A polling type communication network system according to claim 1, wherein the first and second channels are wireless lines.

5. A method of communication in a network system having a master station, a first channel, a second channel, and at least two slave stations operatively connected to the master station through the first and second channels for transmitting data, comprising the steps of:

(a) performing sequential polling of the slave stations from the master station in a predetermined sequence through the first channel even during a transmission of data between the master station and any of said slave stations;

(b) registering a data transmission request from a first slave station in the master station through the second channel during a data transmission by a second slave station;

(c) performing interrupt polling, from the master station, of the first slave station having the data transmission request, prior to continuing said sequential polling after completion of the data transmission;

(d) responding to said sequential polling and transmitting a disconnection signal to the master station through the second channel when data to be transmitted does not exist;

(e) responding to said sequential polling by transmitting, in response to said sequential polling, a connection signal to the master station through the second channel when data to be transmitted exists, and transmitting the data to the master station until the data transmission is completed;

(f) responding to said sequential polling of first slave station during the data transmission, and transmitting the data transmission request to the master station when the data to be transmitted exists; and (g) responding to said interrupt polling and transmitting, in response to said interrupt polling, the data to the master station until the data transmission is completed.

6. A polling type communication network system for transmitting data between slave stations and a master station via first and second channels, said system comprising:

a master station and slave stations;
said master station comprising:
sequential polling means for polling said slave stations through the first channel in a predetermined order by outputting a terminal number identifying one of said slave stations to be polled and by outputting a reception-in-progress signal indicating whether said master station is currently receiving data;

master reception means for receiving a data transmission request signal, a transmission-in-progress signal and the data through the second channel from said slave stations;

terminal number storage means for storing the terminal numbers of said slave stations issuing the data transmission request signal requesting control of the second channel to transmit the data to said master reception means, provided the reception-in-progress signal indicates said master reception means is currently receiving data; and stack polling means for polling the slave stations corresponding to the terminal numbers stored in said terminal number storage means after the transmission-in-progress signal indicates said master reception means is available to receive data by interrupting the polling by said sequential polling means; and said slave stations, operatively connected to said master station via the first and second channels, each slave station comprising:

slave input/output means for receiving the terminal number and the reception-in-process signal from said sequential polling means, and for outputting, in response thereto, the data transmission request signal and the transmission-in-process signal, and, if the reception-in-progress signal indicates said master reception means is available to receive data, the data; and stack response means for receiving the terminal number from said stack polling means and for transmitting the data corresponding thereto to said master reception means.

7. A polling type communication network system according to claim 6, wherein said terminal number storage means prevents the storing of the terminal number corresponding to the slave station currently transmitting data to said master reception means based upon the transmission-in-progress signal.

8. A method of polling slave stations from a master station to transmit data therebetween via first and second channels, comprising the steps of:

(a) sequentially polling the slave stations from the master station through the first channel in a predetermined order by outputting a terminal number identifying one of the slave stations to be polled and by outputting a reception-in-progress signal indicating whether the master station is currently receiving data;

(b) receiving the terminal number and the reception-in-process signal at the slave stations and outputting, in response thereto, the data transmission request signal and the transmission-in-progress signal, and, the data provided the reception-in-progress signal indicates the master station is available to receive data;

(c) storing the terminal number of the slave station issuing the data transmission request signal requesting control of the second channel to transmit the data to the master station, provided the reception-in-progress signal indicates the master station is currently receiving data;

(d) interrupting said polling in step (a) and polling the slave station corresponding to the terminal number stored in step (c) from the master station through the first channel after the transmission-in-progress signal indicates the master station is available to receive data; and (e) receiving the terminal number from said polling of step (d) at the slave stations and transmitting the data corresponding thereto to the master station; and (f) returning to said polling of step (a) after completion of step (e).

9. A method of polling slave stations according to claim 8, wherein said method further comprises the step of (g) preventing the storing of the terminal number corresponding to the slave station currently transmitting data to the master station based upon the transmission-in-progress signal.

* * * * *